Patented Nov. 13, 1923.

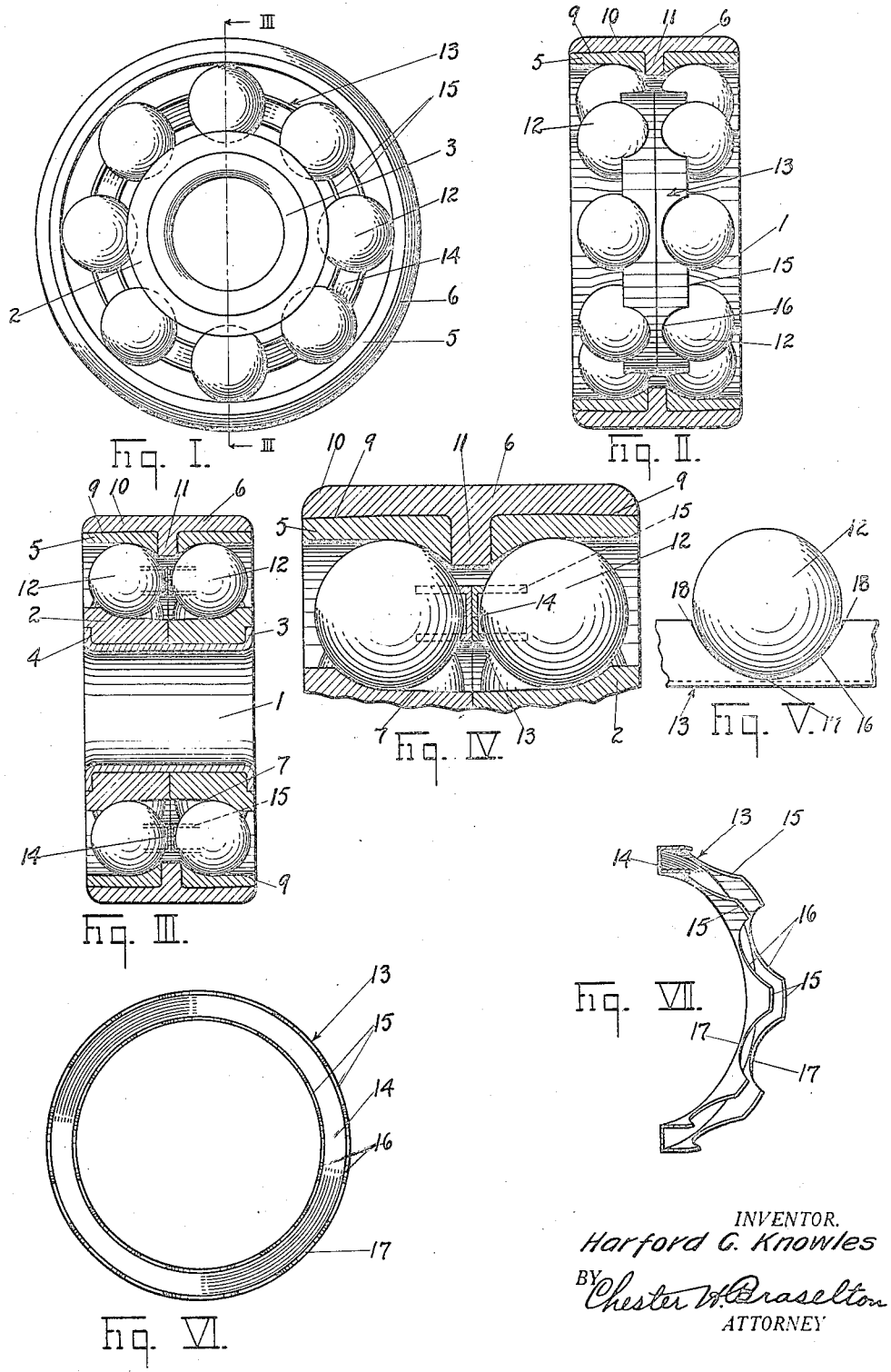

1,474,081

UNITED STATES PATENT OFFICE.

HARFORD C. KNOWLES, OF ELMIRA, NEW YORK, ASSIGNOR TO THE WILLYS-MORROW COMPANY, OF ELMIRA, NEW YORK, A CORPORATION OF OHIO.

ANTIFRICTION BEARING.

Application filed June 11, 1919. Serial No. 303,332.

*To all whom it may concern:*

Be it known that I, HARFORD C. KNOWLES, residing at Elmira, county of Chemung, State of New York, have invented certain new and useful Improvements in Antifriction Bearings, of which I declare the following to be a full, clear, and exact description.

This invention relates to anti-friction bearings, and is particularly directed to the means employed for suitably spacing the anti-friction elements from each other in a double race bearing, in such a manner as to permit relative movement of the anti-friction elements of one race independently of those of the other.

One object of the invention is to provide a simple and efficient form of ball retainer which is of simple construction and efficient in operation.

A further object of the invention is to provide a novel form of ball retainer for use in a double row bearing which is constructed in such a manner as to permit relative movement of the balls of one row independently of those of the other.

A further object of the invention is to provide a simple and efficient form of ball retainer constructed in such a manner as to normally bear against the balls only at points substantially in line with the axis of rotation of the balls.

A further object of this invention relates to economies of manufacture and details of construction as will appear from the detailed description to follow.

The objects of the invention are accomplished in one instance by the devices and means described in the following specification, but it is evident that the same may be varied widely without departing from the scope of the invention as pointed out in the appended claims.

A structure constituting one embodiment of the invention, which may be the preferred, is illustrated in the accompanying drawing forming a part hereof, in which:—

Figure I is a side elevational view of an anti-friction bearing embodying this invention.

Figure II is a view of the ball bearing, partially in transverse section, illustrating the relative location of the ball retainer members with respect to each other and the anti-friction elements of the two races.

Figure III is a transverse sectional view, taken along the line III—III of Figure I and illustrating the relative position of the various elements of the bearing.

Figure IV is an enlarged detail sectional view, similar to that shown in Figure III.

Figure V is a detail view illustrating the normal position of one of the balls when positioned within one of the ball retainer seats.

Figure VI is a top plan view of the ball retainer.

Figure VII is a perspective view, partially in section, of one of the ball retainers illustrating the relative location of the prongs and seats.

In the construction of ball bearings of the double row type, it has been found to be highly desirable to provide suitable means for spacing the anti-friction elements of each row from each other in such a manner as to permit relative rotation of the elements of each row with respect to those of the other row. In the accomplishment of this object, applicant has provided a pair of similarly constructed ball retainers, each of which is provided with outwardly extending prongs or projections adapted to be interposed between the adjacent anti-friction elements of each race so as to properly space the adjacent anti-friction elements from each other. The ball retainers are preferably positioned between the opposite races so as to be retained in position by the anti-friction elements and each ball retainer is provided with a flat base portion, the base portions of the two retainers being adapted to co-operate with each other to prevent disengagement of either of the ball retainers from the anti-friction elements of its corresponding race. In the construction of the ball retainer members, seats are provided between the outwardly extending projecting portions for the reception of the anti-friction elements of each race and these seats are preferably constructed to normally bear against the anti-friction elements only at points substantially in line with the axis of rotation of the elements.

Referring to the drawings, similar reference characters designate corresponding parts throughout the several views and the sectional view is taken looking in the direction of the small arrows at the ends of the section line.

In the embodiment of the invention illustrated herewith, 1 designates the interior cylindrical sleeve upon which the inner bearing members 2 of the bearing are mounted, the outer end portions of the cylindrical sleeve being preferably bent outwardly to form circumferential flanges 3 which preferably fit within grooves 4 formed upon the outer surface of the two inner bearing members. Oppositely positioned with respect to each of the inner bearing members 2 is an outer bearing member 5, the two outer bearing members being positioned within and retained in proper place by an outer bearing sleeve 6.

Each of the inner bearing members 2 is provided upon a portion of its exterior surface with a curved inclined race portion 7 which in the assembled position of the elements is inclined in the opposite direction from and co-operates with a curved inclined race formed upon the inner surface of the outer bearing member 5 to provide bearing surfaces for the anti-friction elements of the bearing. Each of the outer bearing members 5 is provided with a slightly beveled outer surface 9 as most clearly indicated in Figure IV, against which one of the outwardly extending portions 10 of the outer sleeve member is adapted to be forced into close contact in order to securely retain the outer bearing members in proper position relative to the remaining portions of the bearing. An annular lug 11 extends inwardly from the outer sleeve 6, preferably being formed integral therewith, so as to properly space the inner faces of the outer bearing members from each other. Two rows of anti-friction elements 12 are interposed between the two sets of inner and outer bearing members 2 and 5 and bear against the oppositely inclined surfaces of these members for supporting the load. For convenience an inner bearing member 2 and its companion outer bearing member 5 will hereinafter be termed a race. A pair of similarly constructed retainers 13 are positioned between the two rows of anti-friction elements to retain the anti-friction elements in suitable spaced relation to each other and for permitting the anti-friction elements of one row to rotate with respect to those of the other row. The retainers 13 are each provided with a base portion 14 of annular form, while a plurality of projections or prongs 15 extend outwardly from each of the opposite edges of the base so as to be adapted to be interposed between adjacent anti-friction members of one of the races. The projections or prongs 15 are cut away upon opposite sides to form spherical seats 16 for the reception of the several anti-friction elements.

It will be seen upon reference to Figure V that the spherical seats are so constructed that the anti-friction elements normally bear thereagainst only at the points 17 substantially in line with the axis of rotation of the anti-friction elements, thus permitting the anti-friction elements to revolve freely and to reduce as far as possible the frictional resistance due to their engagement with the retainer. The curved seats are so constructed that the curve is of somewhat greater radius than the radius of either of the anti-friction elements, thus preventing under normal circumstances the end portions 18 of the prongs 15 from engaging with the sides of the anti-friction elements.

The projections 15 terminate short of the plane of the centers of the anti-friction elements of one row, as clearly shown in Figure IV, thus there is no gripping of the several anti-friction elements by the retainer, but the anti-friction elements are prevented from moving outwardly away from the retainer only by the co-action of the inclined curved surfaces of the bearing members.

It will be seen from the above description that the construction illustrated herewith provides a simple and efficient means for suitably spacing the anti-friction elements of a double row bearing from each other to readily permit rotative movement of the anti-friction elements of one row relative to those of the other row, while maintaining the anti-friction elements of each row at all times properly spaced from each other. The ball retainers illustrated herewith are readily and easily constructed and engage with the anti-friction elements to reduce to the lowest possible point the frictional resistance ordinarily encountered between the anti-friction elements and the retaining members, while at the same time the retaining members are constructed so as to be capable of movement relative to each other so as to permit proper relative movement of the anti-friction element of the two rows.

While I have shown and described in considerable detail a specific embodiment of my invention, it is to be understood that this showing and description is illustrative only and for the purpose of rendering my invention more clear and that I do not regard the invention as limited to the details of construction illustrated or described, nor any of them, except in so far as I have included certain limitations within the terms of the following claims, in which it is my intention to claim all novelty inherent in my invention broadly as well as specifically.

What I claim as new and desire to secure by Letters Patent is:

1. In an anti-friction bearing, a pair of races, a pair of similarly constructed retainers located between the races, each of the retainers being adapted to co-operate with the anti-friction elements of one race for the purpose of maintaining the anti-friction elements in spaced relation relative to each other, each of the retainers being provided with a base portion and projections extending from the concentric edges of the base portion adapted to be positioned between adjacent anti-friction elements, the ends of the projections terminating short of the plane of the anti-friction elements and being spaced therefrom to prevent binding of the elements in the retainers.

2. In an anti-friction bearing, a pair of races, anti-friction elements positioned in the races, a pair of retainers located between the races, each of the retainers being adapted to co-operate with the anti-friction elements of one race for the purpose of maintaining the anti-friction elements in spaced relation relative to each other, and being provided with seats for the anti-friction elements constructed in such a manner as to normally bear against each anti-friction element only at those points which are in closest proximity to the axis of rotation of the element.

3. In an anti-friction bearing, a pair of races, anti-friction elements positioned in the races, a pair of independently movable retainers located between the races, each of said retainers comprising an annular base portion, spaced projections extending from concentric edges of the base portion and adapted to extend between adjacent anti-friction elements for the purpose of maintaining them in suitable spaced relation relative to each other, and curved seats located between adjacent projections, the curved seats being constructed on a curve of greater radius than the spherical surface of the anti-friction elements.

4. In a bearing, a plurality of anti-friction elements, a retainer having an annular base portion in alinement with the axes of rotation of said elements, spaced projections extending outwardly from concentric edges of the base portion and adapted to project between adjacent anti-friction elements, the sides of said projections having a curvature of greater radius than the adjacent surfaces of said anti-friction elements, whereby the friction between the retainer and the anti-friction elements is reduced to a minimum.

5. In a device of the class described, a plurality of anti-friction elements, a retainer having an annular base portion, a plurality of spaced projections extending from concentric edges of the annular base portion and adapted to project between adjacent anti-friction elements, the adjacent edges of the projections being curved in such a manner as to provide a slight clearance space between each anti-friction element and the side of the adjacent projection.

6. In a device of the class described, a plurality of anti-friction elements, a retainer having an annular base portion, a plurality of spaced projections extending from concentric edges of the annular base portion and terminating short of the center line of the anti-friction elements, and curved seats for each anti-friction element constructed in such a manner as to normally bear against the anti-friction elements only at points adjacent the axis of rotation of the elements.

7. In a device of the class described, a plurality on anti-friction elements, independently movable retainers each having an annular base, the said bases being slidable upon each other, a plurality of spaced projections extending in opposite directions from the bases and from the concentric edges of the bases, the said projections terminating short of the plane of the centers of the anti-friction elements and forming curved seats for each anti-friction element.

8. In a bearing, the plurality of anti-friction elements, a retainer having an annular base portion, spaced projections extending outwardly from the concentric edges of the base portion and adapted to project between adjacent anti-friction elements and terminating short of the plane of the centers of adjacent anti-friction elements, and seats for the said elements curved in such a manner as to provide a clearance between each anti-friction element and the ends of the adjacent projections.

In testimony whereof, I affix my signature.

HARFORD C. KNOWLES.